United States Patent [19]
Ito et al.

[11] Patent Number: 6,099,226
[45] Date of Patent: Aug. 8, 2000

[54] BAR LOADER

[75] Inventors: Takazo Ito, Hachioji; Kenji Sato, Yachiyo, both of Japan

[73] Assignee: Ikuraseiki Seisakusho Co., Ltd., Shimodate, Japan

[21] Appl. No.: 09/124,923

[22] Filed: Jul. 29, 1998

[30]     Foreign Application Priority Data

Jul. 30, 1997  [JP]  Japan .................................. 9-204251

[51] Int. Cl.[7] .................................................. B23Q 5/54
[52] U.S. Cl. ............................... 414/14; 414/17; 82/126; 82/127; 82/902
[58] Field of Search ........................... 414/14, 17, 746.3; 82/126, 127, 902

[56]          References Cited

U.S. PATENT DOCUMENTS

| | | |
|---|---|---|
| 3,145,513 | 8/1964 | Porath . |
| 4,421,446 | 12/1983 | Leon et al. ................................ 414/17 |
| 4,507,992 | 4/1985 | Vandevoir et al. ....................... 82/126 |
| 4,628,779 | 12/1986 | Louis . |
| 4,638,693 | 1/1987 | Sugimoto ................................. 414/14 |
| 4,889,024 | 12/1989 | Geiser ..................................... 82/127 |
| 4,953,429 | 9/1990 | Arisaka et al. ........................... 82/127 |
| 5,048,383 | 9/1991 | Geiser et al. ............................. 82/126 |
| 5,333,524 | 8/1994 | Goforth ................................... 82/127 |
| 5,345,847 | 9/1994 | Weller ..................................... 414/14 |
| 5,617,769 | 4/1997 | Bjorck et al. . |
| 5,662,014 | 9/1997 | Link ........................................ 414/14 |

OTHER PUBLICATIONS

Patent Abstracts of Japan vol. 013, No. 077 (M–801), Feb. 22, 1989 & JP 63 278704 A (Alps Tool:KK), Nov. 16, 1988.

*Primary Examiner*—Douglas Hess
*Attorney, Agent, or Firm*—Pillsbury Madison & Sutro LLP

[57]          ABSTRACT

A bar loader for feeding a bar to a bar machining apparatus comprises a feeding rod for moving the bar and a guide rail for guiding the bar. The guide rail includes a guide rail body with an upper opening for receiving the bar and a lid member for covering the upper opening of the guide rail body and is operable to be opened and closed. A bar passageway formed between the guide rail body and the lid member has an inner wall surface. A plurality of oil grooves are formed on the inner wall surface which extend in a circumferential direction and arranged at a distance from each other in a longitudinal direction of the guide rail. It also has oil supplying system for supplying oil into the bar passageway.

6 Claims, 4 Drawing Sheets

BAR LOADER

BACKGROUND OF THE INVENTION

The present invention relates to a bar loader for feeding a bar to a bar machining apparatus such as a NC automatic lathe, and more particularly, to a bar loader having a capability of preventing vibration and noise.

DESCRIPTION OF THE PRIOR ART

A bar loader which is configured to automatically feed an elongated bar to a bar machining apparatus, such as a NC automatic lathe, has been known. An end portion of the bar is machined by the bar machining apparatus. The bar loader has a guide rail for feeding the bar to be processed to the bar machining apparatus. It has a channel shape with an open top and extends straight toward the bar machining apparatus. A trailing end portion of the bar is held by a finger chuck provided at a leading end of a feeding rod whereas the leading end portion thereof is held by a collet chuck of the bar machining apparatus. The bar is fed to the bar machining apparatus by the feeding rod which moves forward and backward in the guide rail while the bar is rotated at a high speed.

The middle portion of the bar between the trailing end portion held by the finger chuck and the leading end portion held by the collet chuck is deflected due to its own weight, especially in the case of a slender bar. Further, the original shape of the bar may be curved. In such a case, the middle portion thereof makes contact with an inner wall surface of the guide rail. During machining operations, the bar is rotated at a high speed within the guide rail. Therefore, the contact between the bar and the inner surface of the guide rail causes vibration and noise.

An oil type bar loader has been known as a bar loader which has a capability of reducing the vibration and noise while machining the bar. The conventional oil type bar loader has a guide rail whose bar feeding passageway formed therein is completely liquid-sealed, and the bar passageway is filled with oil. The bar is positioned at a center of the guide rail by a fluid mechanical centripetal action caused by the rotation of the bar in the oil, thereby contact between the bar and the guide rail is prevented.

However, the bar loader having the liquid-sealed bar passageway requires precisely formed parts which can sealingly engage with each another and a complicated mechanism for opening and closing a lid for the guide rail which results in higher manufacturing costs.

Therefore, the object of the present invention is to provide a bar loader which is capable of reducing the vibration and noise problem and yet has a simpler structure.

SUMMARY OF THE INVENTION

The object of the present invention can be accomplished by a bar loader for feeding a bar to a bar machining apparatus which comprises a feeding rod for moving the bar; a guide rail for guiding the bar, the guide rail including a guide rail body with an upper opening for receiving the bar and a lid member for covering the upper opening of the guide rail body and is operable to be opened and closed, a bar passageway formed between the guide rail body and the lid member and having an inner wall surface; a plurality of oil grooves formed on the inner wall surface which extend in a circumferential direction and are arranged at a distance from each other in a longitudinal direction of the guide rail; and an oil supplying system for supplying oil into the bar passageway. According to the present invention, even though the oil supplied to the bar passageway flows out of an opening of the guide rail, some of the oil flows into the plurality of oil grooves and is stored therein. As the number of rotations of the bar increases, a circumferential surface of the bar forces the oil in the oil groove to move along therewith to form an oil layer between the bar and the inner wall surface of the bar passageway. The oil acts as a cushion to prevent the bar from making contact with the inner wall surface of the guide rail so that the vibration and the noise may be reduced. The lid member prevents oil scattering and the bar from jumping out of the guide rail during the rotation of the bar.

Further, the above mentioned object of the present invention may also be accomplished by a bar loader for feeding a bar to a bar machining apparatus, which comprises a feeding rod for moving the bar; a guide rail for guiding the bar, the guide rail including a guide rail body with an upper opening for receiving the bar and a lid member for covering the upper opening of the guide rail body and is operable to be opened and closed, a bar passageway formed between the guide rail body and the lid member and having an inner wall surface; a plurality of annular oil grooves formed on the inner wall surface which extend in a circumferential direction and arranged at a distance from each other in a longitudinal direction of the guide rail; and an oil supplying system for supplying oil into the bar passageway. In the present invention, the oil groove has an annular shape and is formed on the inner wall surface of the bar feeding passage. The oil supplied to the bar feeding passage flows into the oil grooves so that a circumferential surface of the bar forces the oil in the oil grooves to move along therewith in the circumferential direction to form the annular shape oil layer about the bar as the number of rotation of the bar increases. The hydrodynamic centripetal force of the oil acts on the circumferential surface of the bar and lifts the bar toward the center of the bar feeding passage. Therefore, the bar is prevented from making contact with the inner wall surface of the bar feeding passage which results in reducing the vibration and noise.

According to an embodiment of the present invention, the plurality of oil grooves are arranged substantially at equal distance from each other in a longitudinal direction of the guide rail. Therefore, the entire bar may be lifted to avoid the contact therebetween which results in further reduction in the vibration and noise can be achieved.

Besides, according to another embodiment of the present invention, the lid member has a plurality of lid portions and the feeding rod with a flag portion, and the bar loader further comprises an opening and closing mechanism for the lid portions and a first controller to control the opening and closing operation of the opening and closing mechanism so as to allow the flag portion to advance. It enables the flag portion of the feeding rod to advance forwardly while the bar can be accommodated in the bar passageway to achieve reduction in the vibration and noise.

Furthermore, according to another embodiment of the present invention, the oil supplying system has an oil pump for supplying oil, and a thermal sensor mounted on the oil pump, and the bar loader further comprises an alarm and a second controller for actuating the alarm when the second controller determines that the temperature of the oil pump has risen above a predetermined temperature level based on a signal transmitted from the thermal sensor. Therefore, it may prevent a fire which may be caused by the temperature rise of the oil pump.

With reference to the attached drawings, the details of a preferred embodiment shall be described herein below.

PREFERRED EMBODIMENTS OF THE INVENTION

Figure 1A:
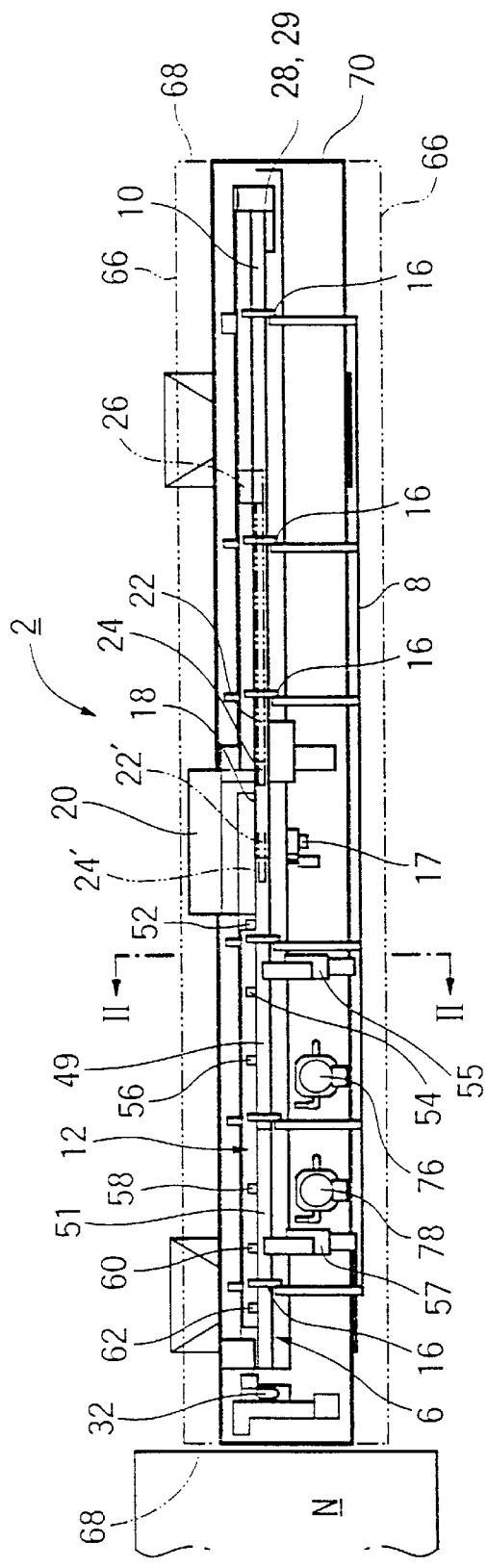
FIG. 1(a) is a schematic plan view generally illustrating the bar loader in accordance with the present embodiment where an upper wall, a side wall and an end wall of the outer hood are illustrated by the dotted lines so as to show the construction of the guide rail.

As shown in FIG. 1(a), the bar loader 2 is disposed adjacent to a NC automatic lathe "N" in front thereof. The bar loader 2 comprises a base 4 supported by a stand 3 and a guide rail 6 which is supported by the base 4. The guide rail 6 extends straight toward the NC automatic lathe "N" to feed a bar "B" to the NC automatic lathe "N". The guide rail 6 comprises a channel-shaped guide rail body 10 whose upper portion is open to receive the bar which is taken out of a stock rack 8 described below, and a lid member 12 which sealingly closes the upper opening of the guide rail body 10. It is to be noted that both ends of the guide rail 6 are open. A stock rack 8 for holding a plurality of bars "B" is disposed diagonally above and in parallel to the guide rail 6. Further, a shaft 14 is provided vertically above and in parallel to the guide rail 6. It is rotatably driven by a motor (not shown). A plurality of index plates for taking out the bar "B" from the stock rack 8 are fixed to the shaft 14 at a distance from each other. Furthermore, as shown in FIG. 1(a), a remnant ejecting outlet 18 having a hatch (not shown) which is opened and closed by a cylinder 17 is provided in a bottom wall of the guide rail body 10. A remnant collecting box 20 is located under the remnant ejecting outlet 18.

As shown in FIG. 1(a) and (b), a feeding rod 22 (22') for feeding the bar to the NC automatic lathe "N" is accomodated within the guide rail body 10. A finger chuck 24 (24') is provided at a leading end of the feeding rod 22 to hold the trailing end portion of the bar. Further, a so-called "flag portion" 26 is mounted on the trailing end of the feeding rod 22 and it extends horizontally out of the upper opening of the guide rail body. The flag portion 26 is coupled with an endless chain which runs along a sprocket (not shown). A servo motor 28 having an encoder is provided at the rear end portion of the guide rail 6. The endless chain is driven by the servo motor 28 via the sprocket to move the feeding rod 22 in forward and backward directions within the guide rail 6. At the same time, a pulse signal which corresponds to a moving distance of the endless chain, that is, a moving distance of the flag portion 26 of the feeding rod 22, is transmitted by the encoder 29 to a controller 30.

Further, as shown in FIG. 1(a), a vibration suppresser 32 for preventing the bar "B" from vibrating is provided at the front end portion of the guide rail 6. The vibration suppresser 32 includes four rollers for holding the circumferential surface of the bar "B" between the collet chuck of the NC automatic lathe which holds the leading end portion of the bar "B" and the finger chuck 24 which holds the trailing end of the bar.

Figure 2:
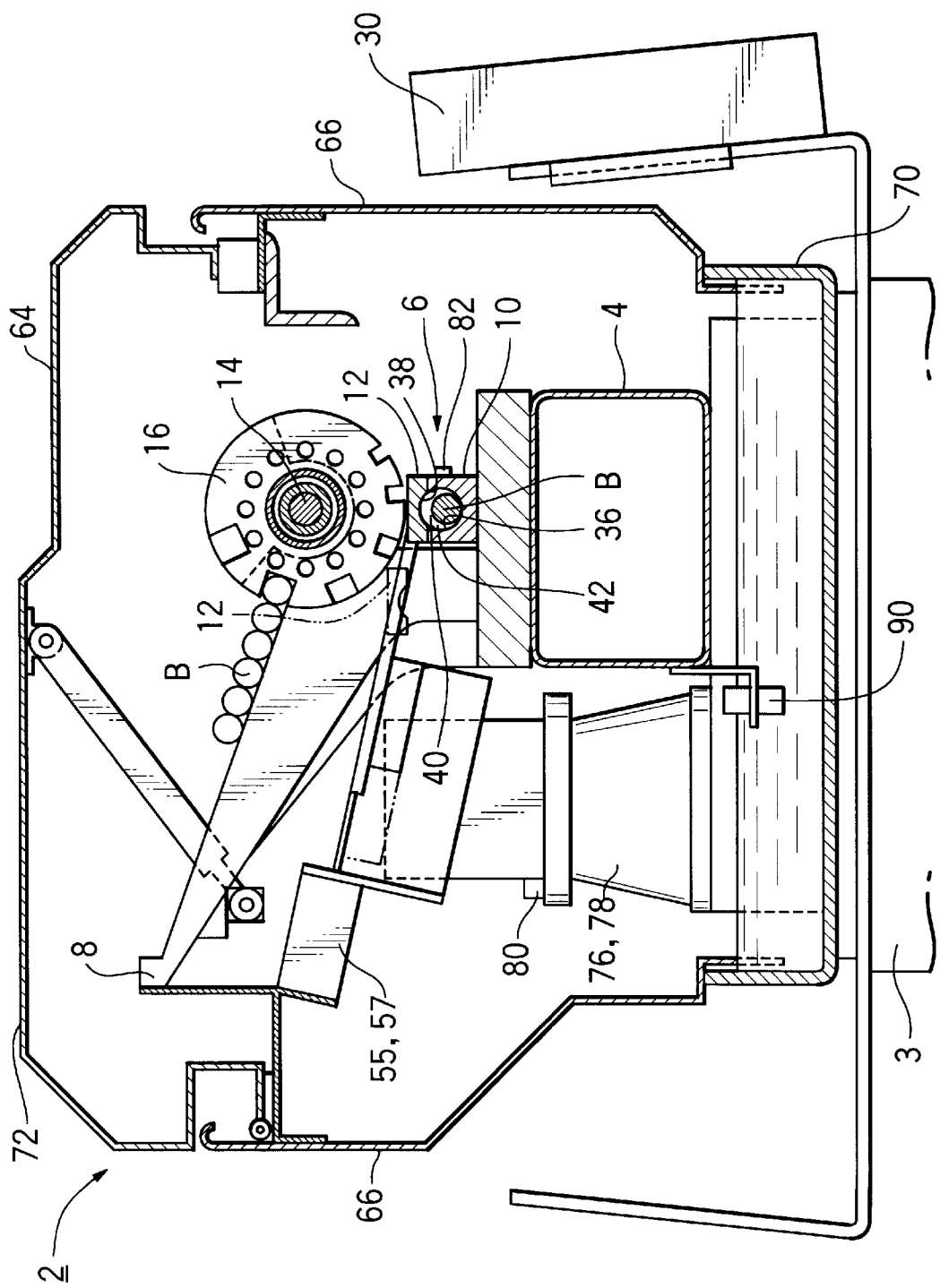
FIG. 2 is a cross sectional view of the bar loader in accordance with the present embodiment taken along a line II—II shown in FIG. 1.
Figure 3:
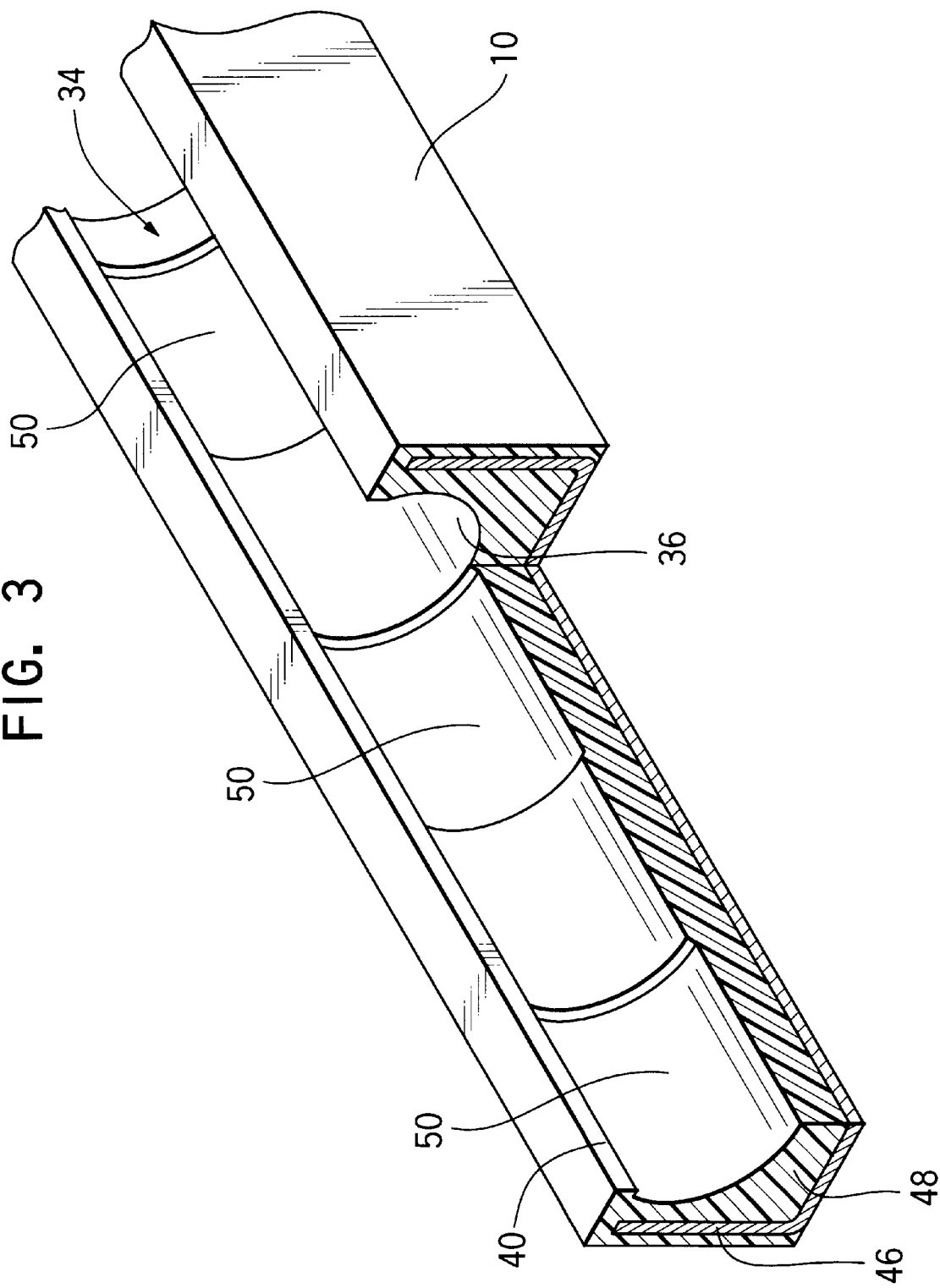
FIG. 3 is a perspective view illustrating the guide rail body partially cut away to show the oil groove 50.
Figure 4:
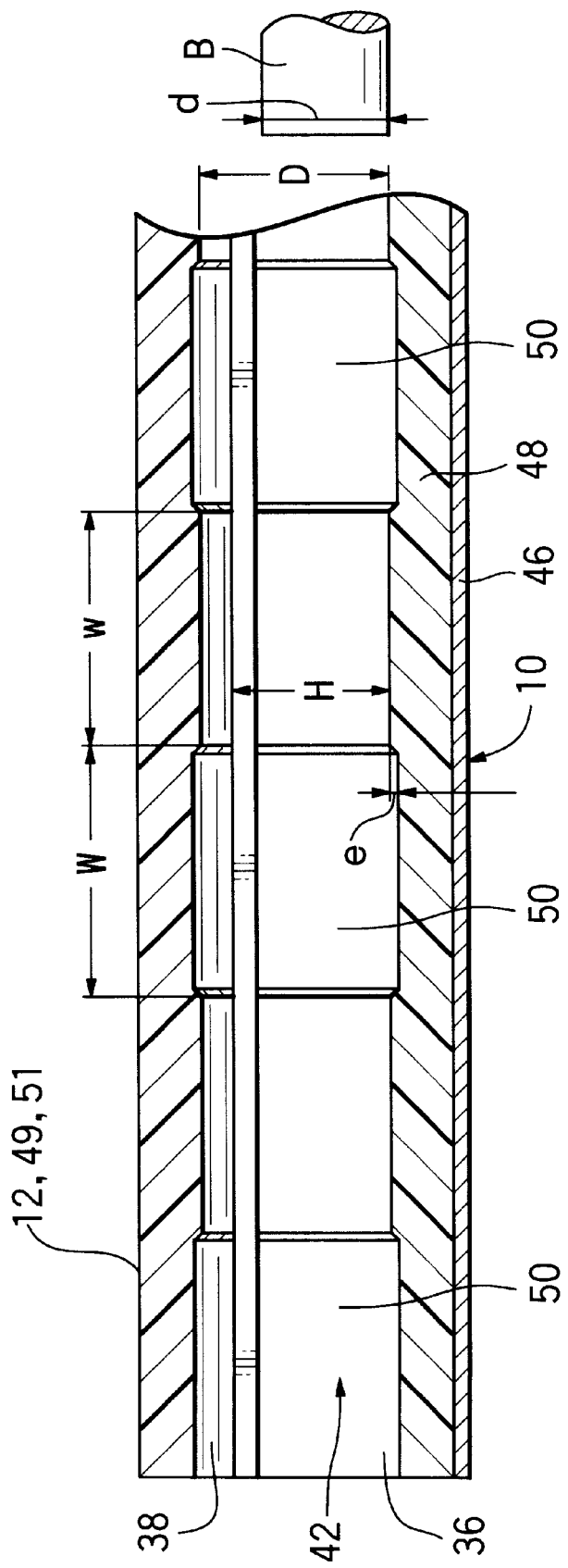
FIG. 4 is a longitudinal cross sectional view illustrating the guide rail body and the lid member.

With reference to FIGS. 3 and 4, the shapes of the guide rail body 10 and the lid member 12 shall be described in more detail. The guide rail body 10 has the channel-like shape with a substantially U-shaped concave portion 36. It defines the bar passageway 34 which extends longitudinally. The lid member 12 also has a curved concave portion 38 which extends longitudinally and is opposite from the guide rail body 10. When an upper opening 40 of the guide rail body 10 is sealingly closed by the lid member 12 as can be seen in FIG. 2 and FIG. 4, a bar feeding passage 42 is formed. The cross-section thereof is substantially circular which is defined by a curved surface. Since the bore "D" of the bar feeding passage 42 is slightly larger than the diameter of the bar "d", a space is formed therebetween. As shown in FIG. 2, the height "H" of the concave portion 36 in the guide rail body 10 is early equal to the diameter "d" of the bar. Therefore, most of the entire bar is accommodated in the concave portion 36 of the guide rail body 10. Each of the guide rail body 10 and the lid member 12 are made of U-shape iron core 46 and resin 48. The resin 48 is preferably urethane resin. The bar feeding passage 42 is formed with the resin 48 on the iron core 46. A plurality of oil grooves 50 are formed by molding the resin 48 on each of the inner wall surfaces of the guide rail body 10 and the lid member 12. When the guide rail body 10 is closed by the lid member 12, each oil groove 50 extends in a circumferential direction therein and forms a substantially annular shape groove. The oil grooves 50 are arranged at equal intervals in the longitudinal direction of the guide rail 6. The width "W" of the oil grooves 50 in the longitudinal direction and the distance "w" between the adjacent grooves 50 are approximately equal to each other and is about 3 cm in the present embodiment. Further, the depth "e" of the oil groove 50 is about 1 mm.

Referring to FIG. 1(a) again, the lid member 12 is transversely divided into two portions including the rear lid portion 49 and the front lid portion 51 with respect to a bar feeding direction. The lid portions 49, 51 are coupled with the rear cylinder 55 and the front cylinder 57, respectively. As shown in FIG. 2, each lid portion 49, 51 is moved individually and independently between an opening position (shown by the dotted lines in FIG. 2) and a closing position (shown by the solid lines in FIG. 2) by the cylinders 55, 57. As described above, the flag portion 26 provided at the trailing end of the feeding rod 22 extends out of the guide rail body 10 through the upper opening 40. The rear lid portion 49 is moved to the opening position by the cylinder 55 to allow the feeding rod 22 to advance when the flag portion 26 approaches thereto. On the other hand, the finger chuck 24 of the feeding rod 22 and the bar, both of which rotate at a high speed during the machining process, are accommodated within the bar feeding passage 42 which is closed by the front lid portion 51.

Further, the oil injecting inlets 52~62 directed horizontally toward the bar feeding passage 42 are provided in the side wall portion of the guide rail body 10. To supply the oil evenly along the guide rail 6 in the longitudinal direction thereof, each of the lid portions 49, 51 is provided with three inlets of the oil injecting inlets 52~62. The injecting inlets are located at substantially equal intervals in the longitudinal direction as shown in FIG. 1(a).

Figure 1B:
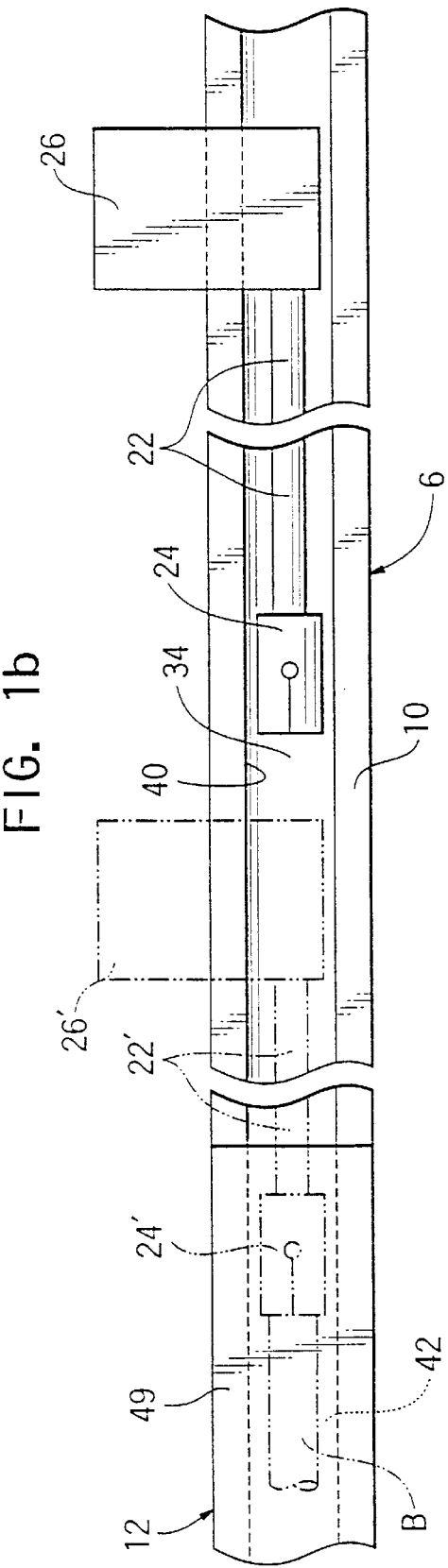
FIG. 1(b) is an enlarged view of FIG. 1 illustrating the relative positions of the guide rail body, the lid member and the feeding rod.

As shown in FIG. 2, the entire guide rail 6 and the stock rack 8 are covered with an outer hood 72 to prevent the oil which leaks from both ends of the guide rail 6 from scattering. It comprises an upper wall 64, a side wall 66, an end wall 68 and a bottom wall 70. The upper wall 64 is hinged to the side wall 66 to enable an access to the guide rail 6. The bottom wall extends in the longitudinal direction along the guide rail 6 and is composed of an oil tray 70 which is large enough to receive the oil which leaks from the guide rail 6. The oil tray 70 collects the oil which flows out of the ends of the guide rail 6 as well as the oil collected by the upper wall 64, the side wall 66 and the end wall 68 of the oil dispersion preventive hood. Further, as shown in FIG. 1(*a*), two oil pumps 76, 78 are mounted on the oil tray 70. They are for pumping the oil stored in the oil tray 70 and for supplying the oil to the oil injecting inlets 52~62. Each of the oil pumps 76, 78 is connected to the oil injecting inlets 52~62 by a tube (not shown), i.e., the rear three oil injecting inlets 52~56 are connected to the first oil pump 76 and the front three oil injecting inlets 58~62 are connected to the second oil pump 78.

As shown in FIG. 2, each of the oil pumps 76, 78 is provided with a thermal sensor 80. Further, a thermal sensor 82 is also mounted on the side wall of the guide rail body 10. The temperature of the oil pumps may rise caused by clogging of the pumps which may result in ignition of the ambient oil mist. Further, the guide rail 6 may be heated by the friction between the bar and the inner wall surface of the guide rail 6 when enough quantity of oil is not supplied to the guide rail 6 due to the clogging of the oil pumps. When a controller 30 determines whether or not the temperature of the oil pump 76, 78 or the guide rail 6 has exceeded a predetermined temperature in response to the signal from the thermal sensor 80, 82, the controller 30 actuates an alarm to inform the operator if such abnormality occurs. Furthermore, a float switch 90 for detecting whether or not there is the oil in the oil tray is provided in the vicinity of the oil tray 70. The operation of the oil pumps 76, 78 without the oil in the oil tray may also cause the fire. When it is detected that there is no oil in the oil tray 70, the controller 30 actuates the alarm to let the operator know it as stated above.

The controller 30 controls the cylinders 55, 57 to open and close the lid portions 49, 51 and the oil pumps 76, 78 to supply the oil to the oil injecting inlets 52~62.

The bar loader 2 in accordance with the present invention is operated as follows. First, the two lid portions 49, 51 are at the opening position so that the upper opening 40 of the guide rail body 10 is open. Further, the feeding rod 22 is at the retracted position at the rear side of the guide rail 6 as shown in FIG. 1(*b*) at the reference numeral 22. The index plate 16 is rotated to take out one bar from the stock rack 8 and to supply the bar into the guide rail body 10 through the upper opening 40 thereof. Next, a pusher (not shown) pushes the trailing end of the bar in the guide rail 6 toward the NC automatic lathe. When the bar advances to the NC automatic lathe, the leading end portion of the bar is clamped by a clamping device. Then, the two lid portions 49, 51 are moved to the closing positions by the corresponding cylinders 55, 57 to close the upper opening 40 thereof. At the same time, the feeding rod 22 advances forwardly and stops at the temporally stopping position shown in FIG. 1(*b*) by the reference numeral 22' where the finger chuck 24 is covered by the lid member 12. Then, a clamping device moves backwardly whereby the trailing end portion of the bar is inserted into the finger chuck 24 provided at the leading end of the feeding rod 22. At this position, the entire finger chuck 24 of the feeding rod 22 and the bar are accommodated within the bar feed passage 42 as shown in FIG. 1(*b*).

Subsequently, the controller 30 actuates the two oil pump 76, 78 and a large quantity of oil is continuously supplied through the oil injecting inlets 52~62 into the bar feeding passage 42 during the bar machining process. The guide rail 6 according to the present invention is a so-called half-closed system, i.e., the upper opening 40 of the guide rail body 10 is sealingly closed by the lid member 12 while both ends thereof are open to allow the oil to flow out therefrom whereas some of the oil remains in the oil grooves 50. By the spinning action of the bar, the oil stored in the oil groove 50 is forced to move along the circumferential surface of the bar. The oil is guided along the oil groove 50 which substantially has the annular shape to form a substantially annular oil layer around the bar. The hydrodynamic centripetal force of the oil acts on the circumferential surface of the bar and the bar is moved toward the center of the bar feeding passage 42 of the guide rail 6. Since the oil grooves 50 are arranged at equal intervals with respect to the longitudinal direction of the guide rail 6, it enables to prevent the entire bar from making contact with the inner wall surface of the guide rail 6. The oil flowing out of the ends of the guide rail 6 and the scattered oil collected by the outer hood is collected in the oil tray 70 located thereunder. It is recycled into the bar passage 42 through the injecting inlets 52~62 into the bar feeding passage 42 by the oil pumps 76, 78.

While the oil is supplied by the oil pumps 76, 78, the temperature of the oil pumps 76, 78 is monitored by the thermal sensor 80. When the controller 30 determines that the temperature of the oil pumps 76, 78 has risen above the predetermined temperature, it actuates the alarm to inform the operator.

When the feeding rod 22 moves forward in the guide rail 6, the encoder 28 transmits the pulse signal to the controller 30. The pulse signal represents the moving distance of the endless chain, that is, the moving distance of the flag portion 26 of the feeding rod 22. The controller 30 counts the number of pulse signals transmitted from the encoder 29. Based on the counted value, the position of the flag portion 26 of the feeding rod 22 is detected. The machined front end portion of the bar is separated by a cutting tool of the NC lathe "N". The feeding rod 22 advances to move the bar in the forward direction. When the controller 30 determines that the flag portion 26 of the feeding rod 22 has approached to the rear lid portion 49, the controller 30 actuates the cylinder 55 to move the rear lid portion 49 to the opening position so as to allow the flag portion 26 to advance forwardly. During this time, the bar and the finger chuck 24 are covered with the front lid portion 51 and are still accommodated in the bar feeding passage 42. The controller 30 stops the oil pump 76 connected to the oil injecting inlets 52~56 located at the rear lid portion 49 while it still keeps actuating the oil pump 78 connected to the oil injecting inlets 58~62 located at the front lid portion 51 to keep supplying the oil to the bar feeding passage 42 so as to supply the oil only to the portion of the passage 42 required. Therefore, it enables to prevent the bar from making contact with the inner wall surface of the guide rail 6 which results in reduction of the vibration and the noise.

The leading end portion of the bar is cut into pieces as the machining process proceeds. When it became too short to make a machined product, the remnant is brought back to the ejecting outlet 18 to be collected in the remnant collecting box 20 by the finger chuck 24. The hatch for the ejecting outlet 18 is opened by the cylinder 17.

Since the bar loader according to the present embodiment is the so-called half-closed system, i.e., the upper opening 40 of the guide rail body 10 is closed by the lid member 12 whereas both ends are open, the complex mechanism of opening and closing the lid member 12 and the precisely formed parts are not required as in the completely closed system in which the oil is sealingly enclosed in the guide rail 6. Therefore, the problems of the vibration and the noise can be solved by the system having a simple structure.

Further, according to the present embodiment, all of the oil does not flow out of the ends of the guide rail 6 and some of the oil remains in the oil grooves 50. It enables the oil layer to be formed between the bar and the inner wall surface of the guide rail 6 by the spinning of the bar and to prevent the bar from making contact with the inner wall surface of the guide rail 6 so as to reduce the vibration and the noise.

Further, according to the present embodiment, since the entire guide rail 6 and the stock rack 8 are covered by the outer hood, the oil is prevented from scattering around. Furthermore, since the oil is collected in the oil tray 70, the oil can be recycled.

Further, in accordance with the present embodiment, the lid member 12 is divided into two lid portions 49, 51. Therefore, part of the lid member 12 can be opened when the flag portion 26 approaches thereto to allow the flag portion 26 to advance. At the same time, it ensures that the bar and the finger chuck 24 stay inside the bar feeding passage 42 which results in the prevention of the vibration and the noise.

Furthermore, according to the present embodiment, since the oil pumps 76, 78, the guide rail body 10 and the oil tray 70 are provided with the thermal sensor 80, the thermal sensor 36 and the float switch 90, respectively, the accident due to fire can be prevented.

The present invention has thus been shown and described with reference to specific embodiments. However, it should be noted that the present invention is in no way limited to the details of the described arrangements but changes and modifications may be made without departing from the scope of the appended claims.

For example, in the present embodiment, the lid member 12 sealingly closes the upper opening 40 of the guide rail body 10. Although liquid-tight seal therebetween is preferable, the upper opening 40 of the guide rail body 10 does not have to be sealed completely. A space may be formed between the upper opening 40 of the guide rail body 10 and the lid member 12 or the guide rail does not necessarily have to have the lid member 12. In such a case, as the bar rotates, the circumferential surface of the bar forces the oil stored in the oil groove 50 of the guide rail body 10 to move along with the inner wall surface of the guide rail 6. The oil layer is formed between the lower surface of the bar and the inner wall surface of the guide rail body 10 thereby. It enables to avoid the contact therebetween to reduce the vibration and noise.

Further, the depth and the width of the oil groove 50, and the distance between adjacent oil grooves 50 may be determined based on the noise level, the quantity of the oil flowing out of the end portions of the guide rail 6, the quantity of the oil to be remained in the oil groove 50, etc.

Further, the space between the bore of the bar passageway 34 and the diameter of the bar is determined so that the oil layer is formed around the bar. The bore of the bar passageway 34 may be relatively larger than the diameter of the bar. Even in this case, the oil flows into the oil grooves 50 of the guide rail body 10 to form the oil layer between the lower surface of the bar and the bottom surface of the inner wall of the guide rail body 10, which enables to avoid the contact therebetween to prevent the vibration and the noise.

Furthermore, in the present embodiment, the oil is injected through the oil injecting inlets 52~56 or 58~62 provided in the guide rail body 10 which is closed by the lid portions 49, 51. However, the controller 30 may control the operation of the oil pumps 76, 78 so as to inject the oil only to the middle portion of the longitudinal bar where deflection is the largest. In this case, the oil is stored in the oil groove 50 in the vicinity of the middle portion of the bar. The hydrodynamic centripetal force of the oil makes the deflected portion of the bar to move toward the center of the bar feeding passage 42. It enables to prevent the bar from making contact with the inner wall surface of the guide rail 6.

What is claimed is:

1. A bar loader constructed and arranged to feed a bar to a bar machining apparatus, comprising:
    a feeding rod which moves said bar;
    a guide rail constructed and arranged to guide said bar, said guide rail including a guide rail body with an upper opening for receiving said bar and a lid member for covering said upper opening of said guide rail body and is operable to be opened and closed, a bar passageway formed between said guide rail body and said lid member which accommodates substantially an entire bar and having an inner wall surface;
    a series of annular oil grooves formed on said inner wall surface and arranged at a distance from each other in a longitudinal direction of the guide rail; and
    an oil supplying system constructed and arranged to supply oil into said bar passageway at an axially intermediate location thereof.

2. A bar loader in accordance with claim 1, wherein said plurality of oil grooves are arranged at substantially an equal distance from each other in a longitudinal direction of said guide rail.

3. A bar loader in accordance with claim 1, wherein said lid member has a plurality of lid portions and said feeding rod has a flag portion, and
    further comprising an opening and closing mechanism for said lid portions and a first controller to control the opening and closing operation of said opening and closing mechanism so as to allow said flag portion to advance.

4. A bar loader in accordance with claim 2, wherein said lid member comprises a plurality of lid portions and said feeding rod has a flag portion, and
    further comprising an opening and closing mechanism for said lid portions and a first controller to control the opening and closing operations of said opening and closing mechanism so as to allow said flag portion to advance.

5. A bar loader constructed and arranged to feed a bar to a bar machining apparatus, comprising:
    a feeding rod constructed and arranged to move said bar;
    a guide rail constructed and arranged to guide said bar, said guide rail including a guide rail body with an upper opening constructed and arranged to receive said bar and a lid member constructed and arranged to cover said upper opening of said guide rail body, said lid member operable to be opened and closed, a bar passageway formed between said guide rail body and said lid member constructed and arranged to accommodate substantially an entire bar and having an inner wall surface;
    a series of annular oil grooves formed on said inner wall surface and arranged at a distance from each other in a longitudinal direction of the guide rail; and
    an oil supplying system constructed and arranged to supply oil into said bar passageway at an axially intermediate location thereof,
    wherein said oil supplying system has an oil pump which supplies oil, and a thermal sensor mounted on said oil pump, and further comprising an alarm and an alarm controller which actuates said alarm when said alarm controller determines that the temperature of said oil pump has risen above a predetermined temperature level based on a signal transmitted from said thermal sensor.

6. A bar loader constructed and arranged to feed a bar to a bar machining apparatus, comprising:

a feeding rod constructed and arranged to move said bar;

a guide rail constructed and arranged to guide said bar, said guide rail including a guide rail body with an upper opening constructed and arranged to receive said bar and a lid member constructed and arranged to cover said upper opening of said guide rail body, said lid member operable to be opened and closed, a bar passageway formed between said guide rail body and said lid member constructed and arranged to accommodate substantially an entire bar and having an inner wall surface;

a series of annular oil grooves formed on said inner wall surface which are arranged at a distance from each other in a longitudinal direction of the guide rail; and an oil supplying system constructed and arranged to supply oil into said bar passageway at an axially intermediate location thereof, wherein said plurality of oil grooves are arranged at substantially an equal distance from each other in a longitudinal direction of said guide rail; and wherein said oil supplying system has an oil pump constructed and arranged to supply oil, and a thermal sensor mounted on said oil pump, and further comprising an alarm and an alarm controller which actuates said alarm when said alarm controller determines that the temperature of said oil pump has risen above a predetermined temperature level based on a signal transmitted from said thermal sensor.

* * * * *